US012262282B2

(12) United States Patent
Tav et al.

(10) Patent No.: US 12,262,282 B2
(45) Date of Patent: Mar. 25, 2025

(54) APPROXIMATING POPULATION DENSITY AND POST-INCIDENT SCENARIO ANALYSIS

(71) Applicant: INTERNATIONAL BUSINESS MACHINES CORPORATION, Armonk, NY (US)

(72) Inventors: Doga Tav, Fredericton (CA); Matthias Seul, Pleasant Hill, CA (US)

(73) Assignee: International Business Machines Corporation, Armonk, NY (US)

(*) Notice: Subject to any disclaimer, the term of this patent is extended or adjusted under 35 U.S.C. 154(b) by 732 days.

(21) Appl. No.: 17/450,074

(22) Filed: Oct. 6, 2021

(65) Prior Publication Data

US 2023/0109089 A1 Apr. 6, 2023

(51) Int. Cl.

| | |
|---|---|
| ***H04W 4/029*** | (2018.01) |
| ***G01C 21/34*** | (2006.01) |
| ***G06Q 10/063*** | (2023.01) |
| ***H04W 8/00*** | (2009.01) |

(52) U.S. Cl.

CPC ........ *H04W 4/029* (2018.02); *G01C 21/3415* (2013.01); *G06Q 10/063* (2013.01); *H04W 8/005* (2013.01)

(58) Field of Classification Search

CPC .. H04W 4/029; H04W 8/005; G01C 21/3415; G06Q 10/063

USPC ........................................................ 455/456.1

See application file for complete search history.

(56) References Cited

U.S. PATENT DOCUMENTS

| | | | |
|---|---|---|---|
| 7,095,336 B2 | 8/2006 | Rodgers | |
| 9,679,487 B1 * | 6/2017 | Hayward | G01S 19/51 |
| 9,881,217 B2 | 1/2018 | Wang | |
| 10,395,521 B2 | 8/2019 | Bansal | |
| 2012/0115505 A1 | 5/2012 | Miyake | |
| 2015/0172856 A1 * | 6/2015 | Vanderwater | H04W 4/029 455/457 |

(Continued)

FOREIGN PATENT DOCUMENTS

| | | |
|---|---|---|
| CN | 102663359 B | 4/2014 |
| CN | 110545558 A | 12/2019 |
| WO | 2015009453 A1 | 1/2015 |

OTHER PUBLICATIONS

"IoT Products, Meshlium," Libelium.com, Accessed: Aug. 17, 2021, https://www.libelium.com/iot-products/meshlium/, 4 pages.

(Continued)

*Primary Examiner* — William Nealon
(74) *Attorney, Agent, or Firm* — Andre L. Adkins

(57) ABSTRACT

According to one embodiment, a method, computer system, and computer program product for population density approximation is provided. The embodiment may include identifying a device as entering a preconfigured distance of a preconfigured area, whereby the preconfigured area is one of a plurality of preconfigured areas. The embodiment may also include gathering device-identifying information corresponding to the device. The embodiment may further include creating a profile for each device using the device-identifying data. The embodiment may also include correlating device movements across the plurality of preconfigured areas using the profile associated with each device. The embodiment may further include calculating a population density based on the correlated device movements.

20 Claims, 5 Drawing Sheets

(56) References Cited

U.S. PATENT DOCUMENTS

| | | | | |
|---|---|---|---|---|
| 2015/0304815 | A1 | 10/2015 | Ghose | |
| 2016/0033285 | A1* | 2/2016 | Hardin | H04W 4/029 701/500 |
| 2016/0037480 | A1* | 2/2016 | Bellamkonda | H04W 12/02 455/456.2 |
| 2016/0196577 | A1* | 7/2016 | Reese | H04W 4/023 705/14.5 |
| 2016/0219398 | A1* | 7/2016 | Kamensky | H04W 4/029 |
| 2017/0006429 | A1* | 1/2017 | Douglas | H04W 4/023 |
| 2018/0286225 | A1 | 10/2018 | Lu | |
| 2019/0011925 | A1 | 1/2019 | Bansal | |
| 2019/0028852 | A1 | 1/2019 | Yamada | |
| 2019/0208432 | A1* | 7/2019 | Carney Landow | G08G 1/0129 |
| 2019/0361950 | A1* | 11/2019 | Ganesan | G06Q 20/3224 |

OTHER PUBLICATIONS

Abedi, et al., "Bluetooth and Wi-Fi MAC Address Based Crowd Data Collection and Monitoring: Benefits, Challenges and Enhancement," 36th Australasian Transport Research Forum (ATRF), Oct. 2013, 18 pages, ReasearchGate, Brisbane, AU, Retrieved from the Internet: <URL: https://www.researchgate.net/publication/259900889_>.

Author Unknown, "Emerging Hot Spot Analysis," ArcGIS Desktop, Accessed: Aug. 17, 2021, https://desktop.arcgis.com/en/arcmap/10.3/tools/space-time-pattern-mining-toolbox/emerginghotspots.htm, 4 pages.

Author Unknown, "How Kernel Density works," ArcGIS Pro 2.8, Accessed: Aug. 17, 2021, https://pro.arcgis.com/en/pro-app/latest/tool-reference/spatial-analyst/how-kernel-density-works.htm, 6 pages.

Besimaltnok, " WiPi-Hunter / PiDense," GitHub, Sep. 21, 2018, https://github.com/WiPi-Hunter/PiDense, 4 pages.

Boulmakoul et al., "Moving Object Trajectories Meta-Model and Spatio-Temporal Queries," International Journal of Database Management Systems ( IJDMS ) vol. 4, No. 2, Apr. 2012, DOI: 10.5121/jdms.2012.4203, pp. 35-54.

Chilipirea, et al., "Presumably simple: monitoring crowds using WiFi," 17th International Conference on Mobile Data Management, Jun. 2016, ResearchGate, Porto, PT, DOI: 10.1109/MDM.2016.42, Retrieved from the Internet: <URL: https://www.researchgate.net/publication/303843715_>, 11 pages.

Depatla et al., "Crowd Counting Through Walls Using WiFi," 2018 IEEE International Conference on Pervasive Computing and Communications (PerCom), Downloaded Aug. 17, 2021, IEEE Xplore, 10 pages.

Hak5, "WiFi Pineapple," Shop.hak5.org, Accessed: Aug. 17, 2021, https://shop.hak5.org/products/wifi-pineapple?variant=32019576094833#TOP, 8 pages.

Hermersdorf, et al., "Sensing in Rich Bluetooth Environments," Workshop on World-Sensor-Web WSW'06 at SenSys'06 [article], 2006, ACM, Boulder, CO, US, Retrieved from the Internet: <URL: http://cosco.hiit.fi/Articles/wsw06.pdf>, 5 pages.

Kostakos, et al. "Wireless detection of end-to-end passenger trips on public transport buses," 13th International EEE Conference on Intelligent Transportation Systems, Sep. 2010, IEEE, Funchal, PT, DOI: 10.1109/TSC.2010.5625062, Retrieved from the Internet: <URL: https://ieeexplore.ieee.org/document/5625062>, pp. 1795-1800.

Lee, et al., "Real-time autonomous crowd control system via detection of crowd anomalies from peer-to-peer devices," IP.com, May 2, 2016, 8 pages, Motorola Solutions, Inc., IP.com No. IPCOM000246067D, Retrieved from the Internet: <URL: https://priorart.ip.com/IPCOM/000246067>.

Mell et al., "The NIST Definition of Cloud Computing", National Institute of Standards and Technology, Special Publication 800-145, Sep. 2011, 7 pages.

Schauer, et al., "Estimating Crowd Densities and Pedestrian Flows Using Wi-Fi and Bluetooth," 11th International Conference on Mobile and Ubiquitous Systems: Computing, Networking and Services (MOBIQUITOUS'14) [journal], Jan. 2014, 8 pages, ResearchGateDOI: 10.4108/icst.mobiquitous.2014.257870, Retrieved from the Internet: <URL: DOI: 10.4108/icst.mobiquitous.2014.257870>.

Seri et al., "The dangers of Bluetooth implementations: Unveiling zero day vulnerabilities and security flaws in modern Bluetooth stacks," BlueBorne 2017, Armis, https://info.armis.com/rs/645-PDC-047/images/BlueBorne%20Technical%20White%20Paper_20171130.pdf, 41 pages.

Vandijk, "RS.Lab2—Spatiotemporal analysis," YouTube, Feb. 7, 2016, https://www.youtube.com/watch?=V3BWJLg0L5w, 3 pages.

Versichele, et al., "The use of Bluetooth for analysing spatiotemporal dynamics of human movement at mass events: A case study of the Ghent Festivities," Applied Geography, Mar. 2012, pp. 208-220, vol. 32, Issue 2, ScienceDirect, DOI:10.1016/j.apgeog_2011.05.011, Retrieved form the Internet: <URL: https://www.sciencedirect.com/science/article/abs/pii/S0143622811000944>.

Weppner, et al., "Bluetooth Based Collaborative Crowd Density Estimation with Mobile Phones," 2013 IEEE International Conference on Pervasive Computing and Communications (PerCom), Mar. 2013, pp. 193-200, IEEE, San Diego, CA, Retrieved from the Internet: <URL: https://ieeexplore.ieee.org/document/6526732>.

Basalamah, "Crowd Mobility Analysis using WiFi Sniffers," (IJACSA) International Journal of Advanced Computer Science and Applications, vol. 7, No. 12, 2016, pp. 374-378.

Tav et al., "Approximating Population Density Based on Device Movements," Application No. PCT/EP2022/075836, Filed: Sep. 27, 2022, 27 pages. (Specs + Drawings).

IBM Appendix P, "List of patent and patent applications treated as related", Filed Herewith, 2 pages.

Tav et al., "Crowd Density Analysis With Multiple Regions", US IBM U.S. Appl. No. 18/186,993, filed Mar. 21, 2023, 30 Pages.

"Patent Cooperation Treaty PCT International Search Report", Applicant's File Reference P202002240, International Application No. PCT/EP2022/075836, International Filing Date: Sep. 16, 2022, Date of Mailing: Jan. 18, 2023, 10 pages.

* cited by examiner

APPROXIMATING POPULATION DENSITY AND POST-INCIDENT SCENARIO ANALYSIS

BACKGROUND

The present invention relates generally to the field of computing, and more particularly to the Internet of Things (IoT).

IoT is a conception of the internet as a network of not only typical computing devices, but also a variety of objects and fixtures connected to that network. These objects have processors, radios, or sensors, and related capabilities. IoT brings together several different technologies to power smart homes, smart cities, and a variety of different businesses. Objects can be stationary—such as networking devices and household appliances—or mobile—such as vehicles, headphones, watches, and cellular phones. These networks can help monitor and manage real-world situations with computational efficiency.

SUMMARY

According to one embodiment, a method, computer system, and computer program product for population density approximation is provided. The embodiment may include identifying a device as entering a preconfigured distance of a preconfigured area, whereby the preconfigured area is one of a plurality of preconfigured areas. The embodiment may also include gathering device-identifying information corresponding to the device. The embodiment may further include creating a profile for each device using the device-identifying data. The embodiment may also include correlating device movements across the plurality of preconfigured areas using the profile associated with each device. The embodiment may further include calculating a population density based on the correlated device movements.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
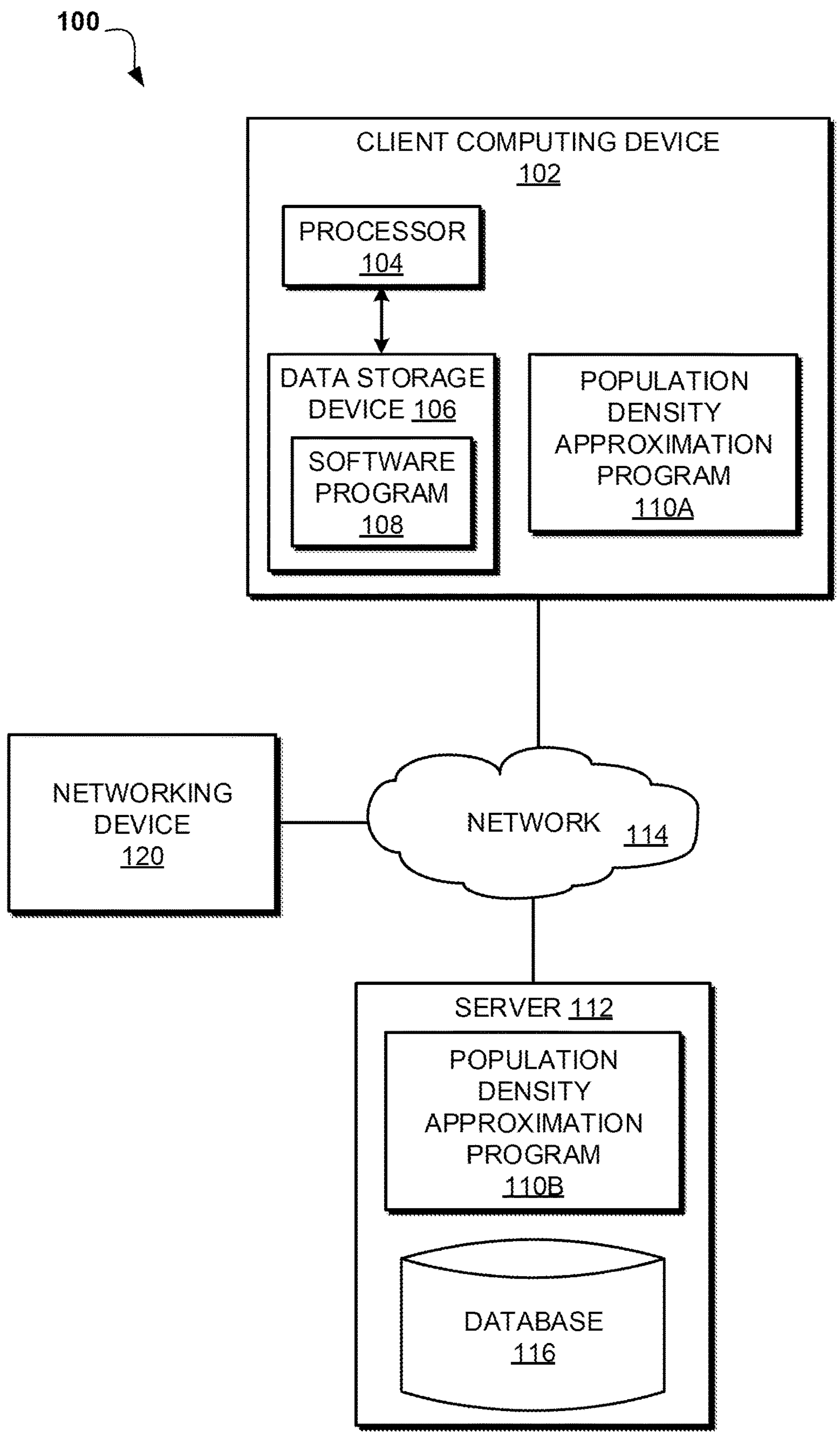
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to the Internet of Things (IoT). The following described exemplary embodiments provide a system, method, and program product to, among other things, collect useful and accurate data about population density and flow through cities or similar areas. Therefore, the present embodiment has the capacity to improve the technical field of IoT by allowing more thorough collection of more precise data, which enables new techniques for smart cities to manage both vehicular and pedestrian traffic safely and quickly.

As previously described, IoT is a conception of the internet as a network of not only typical computing devices, but also a variety of network-connected objects and fixtures that have processors, radios, or sensors, and related capabilities. Objects can be stationary—such as networking devices—or mobile—such as vehicles, watches, and cellular phones. These can be used by smart cities to help manage traffic for safety purposes.

Traffic safety is crucial for pedestrians, cyclists, drivers, and passengers. As smart cities have risen in the past decades, the ability to track and determine the population density has shown itself to be an important factor to ensure public safety. There are existing methods for collecting such data via camera matching photogrammetry and rectification. However, such data is limited in accuracy and precision. Existing solutions that utilize networking functionality may require users to opt into a network connection.

Furthermore, many existing map services track users throughout cities. Such services use techniques such as photogrammetry, Global Positioning System services (GPS), or cellular triangulation to closely track large amounts of data. Such services often require internet connections between the device and a central server, and collect large amounts of data from users for long-term storage. Such data collection may violate user privacy, or may require users to opt into the collection of data they may not be comfortable providing. As such, it might be advantageous to use a more lightweight approach that can track users through publicly broadcast data, and without collecting that data long-term in centralized web servers.

According to at least one embodiment, data may be gathered via wireless networking devices to approximate population density in an area, such as a busy intersection. Unlike other wireless access points, certain networking devices, such as WiFi pineapple devices, can sustain a large number of connections, and can be used to access surface-level information that may anonymously determine a device with or without establishing a connection to that device. This information may be used to correlate the device movements across different preconfigured areas. The networking devices may also approximate the time a device spends in range of each given intersection. Although certain networking devices are known for use in wireless security applications and malicious attacks, the unique properties of the aforementioned networking devices may provide effective support for non-malicious gathering of anonymized data from a large number of devices, as may be seen in a busy public area, that may in turn be used to calculate the population density of a given area.

Furthermore, population density data may be shared with autonomous vehicles to help them better understand their surroundings. For example, it may inform a vehicle that it is approaching a populous intersection, and suggest an alternative route with fewer pedestrians. Furthermore, population density data may be shared with city infrastructure, such as traffic lights, pedestrian lights, and hydraulic bumpers, in order to manage the flow of traffic and keep pedestrians safe.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to collect useful, accurate, and anonymized device data and calculate population density and flow through cities or similar areas.

Referring to FIG. 1, an exemplary networked computer environment 100 is depicted, according to at least one embodiment. The networked computer environment 100 may include client computing device 102, and a server 112, interconnected via a communication network 114. According to at least one implementation, the networked computer environment 100 may include a plurality of client computing devices 102, servers 112, and networking devices 120, of which only one of each is shown for illustrative brevity. Additionally, in one or more embodiments, the client computing device 102 and server 112 may each individually host a population density approximation program 110A, 110B. In one or more other embodiments, the population density approximation program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a population density approximation program 110A, transmit data to and from a networking device 120, such as Wifi pineapple device, and communicate with the server 112 via the communication network 114, in accordance with one embodiment of the invention. In one or more other embodiments, client computing device 102 may be, for example, a mobile device, a telephone, a personal digital assistant, a car, a netbook, a laptop computer, a tablet computer, a desktop computer, a traffic signal, a pedestrian traffic signal, or any type of computing device capable of running a program and accessing a network. As previously described, one client computing device 102 is depicted in FIG. 1 for illustrative purposes, however, any number of client computing devices 102 may be utilized. As will be discussed with reference to FIG. 3, the client computing device 102 may include internal components 302*a* and external components 304*a*, respectively.

The server computer 112 may be a laptop computer, netbook computer, personal computer (PC), a desktop computer, or any programmable electronic device or any network of programmable electronic devices capable of hosting and running a population density approximation program 110B and a database 116 and communicating with the client computing device 102 and networking device 120 via the communication network 114, in accordance with embodiments of the invention. As will be discussed with reference to FIG. 3, the server computer 112 may include internal components 302*b* and external components 304*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The networking device 120 may be capable of sustaining a large number of connections in a public area. The networking device 120 may also be capable of broadcasting information and capturing information that is broadcast from various devices. In at least one embodiment, the networking device 120 may be a WiFi pineapple device. This networking device 120 may transmit data about the number of client computing devices 102 broadcasting wireless signals within a given area to the population density approximation program 110A, 110B, which the population density approximation program 110A, 110B may then count. The networking device 120 may then provide this population information to the population density approximation program 110A, 110B. In at least one embodiment, the networking device 120 may be communicatively coupled to, or internally embedded within, the client computing device 112.

According to the present embodiment, the population density approximation program 110A, 110B may be capable of capturing a count of the number of devices measured by the networking device 120 in a given area, for example a city intersection. Accordingly, the population density approximation program 110A, 110B may calculate population density in a given area using the captured count of devices. In at least one embodiment, the population density approximation program 110A, 110B may further measure the changes to the population density in a given area over time. The population density approximation program 110A, 110B may further track population flow across a larger area (for example, an entire city) over time. The population density approximation program 110A, 110B may further correlate data between devices in order to deduplicate multiple devices that appear to belong to the same individual, providing a more accurate population count. The deduplication may merge profiles of devices that appear to be connected to one another, such as a smart phone and wireless headset that belong to the same user. In at least one embodiment, the client-side population density approximation program 110A may further encode identifying information about the device in order to respect the privacy of the individuals. The population density approximation method is explained in further detail below with respect to FIG. 2.

Figure 2:
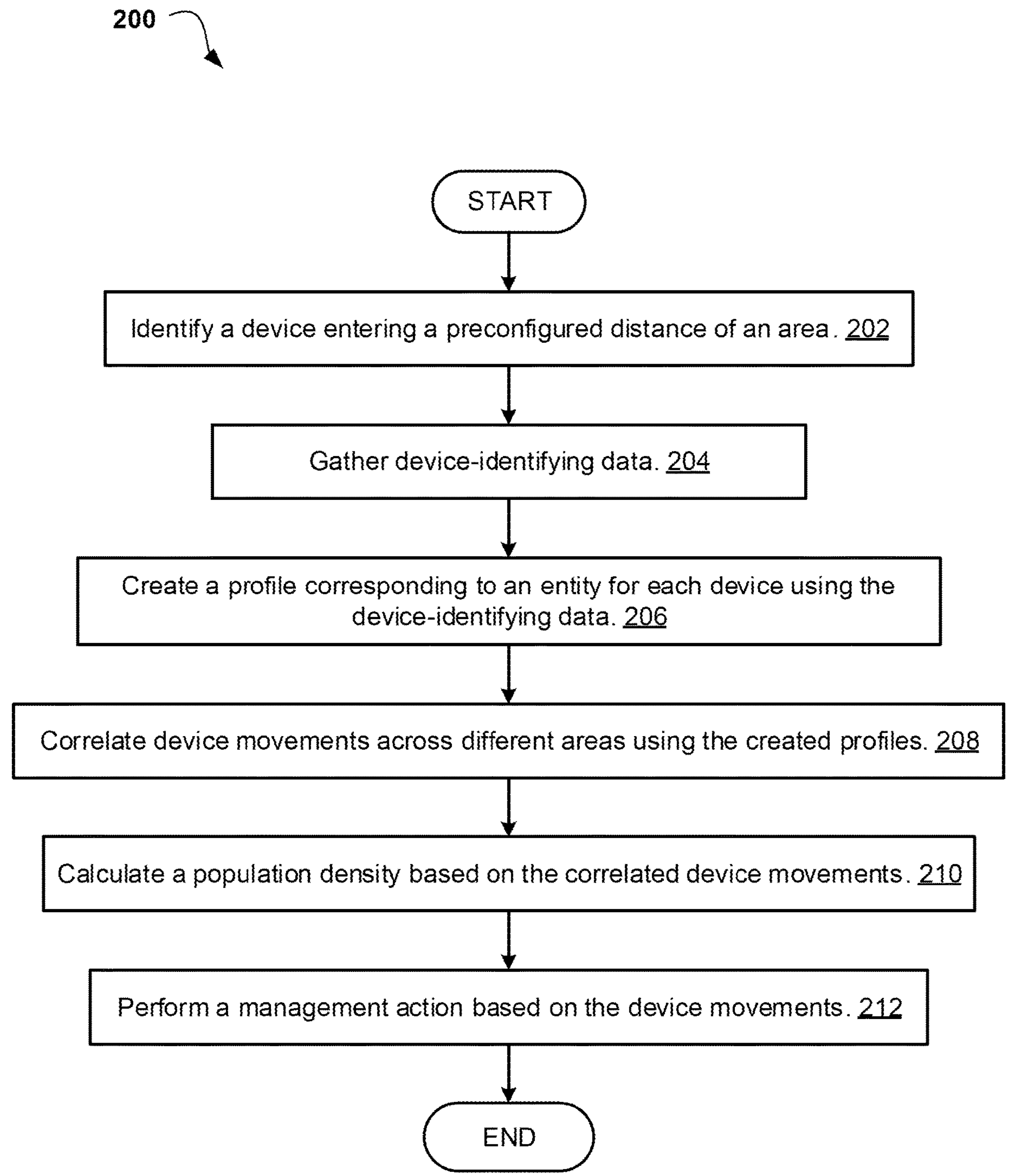
FIG. 2 illustrates an operational flowchart for a process for approximating population density and post-incident scenario analysis according to at least one embodiment.

Referring now to FIG. 2, an operational flowchart illustrating a population density approximation process 200 is depicted according to at least one embodiment. At 202, the population density approximation program 110A, 110B identifies a device as entering within a given distance of a preconfigured area. In at least one embodiment, the preconfigured area may be a stationary area or mobile area. For example, if configured as a stationary area, the preconfigured area may be defined as a city intersection or a store in a shopping center. When configured as a mobile area, as the preconfigured area may be defined as a train car or airplane. In at least one other embodiment, a device may be identified as entering the area by coming within a wireless range of the networking device 120. In yet another embodiment, the device may be identified as entering the given distance around the area using known location detection techniques, such as photogrammetry, GPS, or cellular triangulation.

Then, at 204, the population density approximation program 110A, 110B gathers readily available device-identifying data. In at least one embodiment, the device-identifying data may be an SSID, MAC address, or other data that is broadcast by the client computing device 102 that may be used to identify a device as unique. Since many devices already broadcast this data, the networking device 120 can receive and gather the broadcast data. In at least one embodiment, the population density approximation program 110A, 110B may further gather data not immediately available by utilizing special capabilities of the networking device 120. For example, using the networking device 120, the population density approximation program 110A, 110B may be able to elicit Bluetooth-related device identifying data (e.g., a Bluetooth MAC address), as a pineapple device may be able to do, in case other device identifying data is not available. Device-identifying data may include data sufficient to identify a type of the device. For example, device-identifying data may be encoded in a specific way for mobile phones, or a different way for vehicles.

In at least one embodiment, the population density approximation program 110A, 110B may only collect or gather data when permission is granted by an individual whose device enters the preconfigured area opts in. In an embodiment, a device, such as client computing device 102, may opt-in to the population density approximation program 110A, 110B by attempting to make a Wifi or Bluetooth contention with the networking device 120. Similarly, an individual may opt-in to the population density approximation program 110A, 110B by installing the population density approximation program 110A, 110B on a user device, such as client computing device 102. In yet another embodiment, the population density approximation program 110A, 110B may transmit a notification to the user device requesting an individual to confirm the transmission of device-identifying data to the population density approximation program 110A, 110B. In at least one other embodiment, the population density approximation program 110A, 110B may allow an individual to opt out. For example, the population density approximation program 110A, 110B may display a notification that the user is entering the preconfigured area and allow the user to opt out of participation in population density approximation process 200.

In at least one embodiment, the population density approximation program 110A, 110B may obscure device-identifying data in order to protect the user's privacy. For example, device-identifying data may be processed through a one-way encryption algorithm to create a unique identifier recognized only by the population density approximation program 110A, 110B. If that device is seen again, and encrypted by the same algorithm, it will produce the same unique identifier, allowing the population density approximation program 110A, 110B to recognize that the same device is present without tracking any data that could identify the device in another context.

In at least one other embodiment, the population density approximation program 110A, 110B may collect supplemental data. Supplemental data may include data from internet sources, such as weather services or public transit APIs. Supplemental data may also include data from known location data sources such as photogrammetry, GPS, or cellular triangulation. Supplemental data may further include infrastructure data provided to the population density approximation program 110A, 110B. Infrastructure data may include street maps; infrastructure maps; taxi data; public transit data; data from speed cameras or radar blasters; data pertaining to road work, traffic accidents, and other blockages; data from smart traffic signals; or data from other networking devices. For example, a municipal server may send a message informing the population density approximation program 110A, 110B of a traffic accident in a particular intersection. Alternatively, an airport server may send a message informing the population density approximation program 110A, 110B that a particular flight has been delayed. Furthermore, supplemental data may include additional device data. For example, additional device data may include Bluetooth log data containing a list of Bluetooth devices connected to the client computing device 102. Additional device data may be gathered if broadcast, or elicited from the client computing device 102 using the special capabilities of the networking device 120. Supplemental data may include data sufficient to identify a type of a device.

Then, at 206, the population density approximation program 110A, 110B then creates a profile corresponding to an entity for each device. A profile may be built from the device-identifying data. A profile may be stored temporarily, and may only include information necessary to identify a device uniquely, enhancing privacy. For example, a profile may only be stored in a repository, such as the database 116, on a day-to-day basis, and deleted daily. Profiles may store only obscured device identifying data in the database 116. In at least one embodiment, the database 116 may be placed on an edge server in or near the preconfigured area which does not transfer data to a central server.

Each device may correspond to an entity. An entity may correspond to zero, one, or more devices. For example, if the area is a city intersection, the device may correspond to an anonymous entity, such as a pedestrian, a driver, a passenger, an autonomous robotic device, or a vehicle. In an alternate example, if the area is a store in a shopping center, the entity may be a shopper, a store employee, or a shopping center employee. In yet another example, if the area is a train car, the entity may be a passenger or a transit employee. In an alternate embodiment, each device may correspond to an entity in a direct one-to-one mapping.

Similar to the device-to-entity mapping described above, each profile may correspond to an entity. An entity may correspond to zero, one, or more profiles. As will be described in step 208, the population density approximation program 110A, 110B may deduplicate multiple profiles that correspond to the same entity via a deduplication process. In at least one embodiment, information regarding a type of device may be used to assign a type of entity to a profile. For example, if a device is recognized as being a vehicle-type device, the profile may be assigned as being a vehicle-type entity. Alternatively, if multiple devices in a profile are recognized as being a mobile phone, a smart watch, and a Bluetooth headset, the profile may be inferred as being, and assigned as being, a human.

In at least one embodiment, the population density approximation program 110A, 110B may use the profile to perform an early calculation of population density in the preconfigured area. For example, if 300 profiles are counted passing through an intersection in one hour, the population density may be calculated as 300 profiles per intersection per hour. Alternatively, if the intersection is 100 square feet in size, the population density may be calculated as three profiles per square foot per hour. This calculation may include a weighted reduction to the population count by a historical estimate of number of duplicate profiles that may later be reduced more precisely via deduplication in step 208. Building on the previous examples, if historical data indicates an average of 1.5 devices per entity, the population density may be calculated as 200 entities per intersection per hour, or two entities per square foot per hour.

The profiles may further include at least a portion of the collected supplemental data. For example, the population density approximation program 110A, 110B may associate data taken from a speed camera with a given profile and record that speed data along with the profile. In addition, a profile may include additional device data, such as Bluetooth log data.

Then, at 208, the population density approximation program 110A, 110B correlates device movements across several areas into correlated data based on the created profiles. In at least one embodiment, correlated data may reflect the flow of populations through a larger area. For example, this correlation may be performed by noting the number of profiles leaving one area and entering another area in a given hour. In the example of a smart city, the correlated data may reflect vehicular and pedestrian traffic patterns around a city over time. Alternatively, correlated data may show the most common paths for entities as they get off a given bus at a given bus stop. Similarly, in the example of a shopping center, the correlated data may reflect popularity of different stores in the shopping center over time.

Alternatively, data may be correlated by noting the frequency with which people who leave a stationary area, such as a train station, enter an adjacent stationary area, such as an intersection, and compare it to the frequency with which people enter a mobile preconfigured area, such as a train. This correlated data may indicate the rate at which people leave a train station by foot as compared to the rate at which people leave a train station by train.

In at least one embodiment, the correlated data may include data sufficient to deduplicate multiple devices that relate to a single entity. Deduplication may include, for example, noting a correlation between the movements of two or more devices, such as a smart watch and smartphone, inferring that they belong to the same user, merging their profiles, and counting the profile only once, and not twice, towards the population and population density. The deduplication may be performed by tracking only obfuscated device-identifying information, which areas those devices enter and exit, and when those devices enter or exit the areas. Alternatively, the deduplication may be performed by using additional device data present in profiles, such as Bluetooth log data. The deduplication may also be performed using a combination of additional device data and correlated data. By noting that two different profiles correspond to the same entity and merging those profiles, the population density approximation program 110A, 110B can enhance accuracy of population counts and population density information.

In at least one embodiment, correlated data may include a rate of travel for a given profile. For example, if a profile is shown as entering twelve areas over the course of ten minutes, and the areas are known to each be 40 meters apart from one another in the order in which they are entered, the rate of travel may be calculated as 44 meters per minute. In at least one embodiment, the population density approximation program 110A, 110B may infer and assign a type of entity to a profile based on the rate of travel. For example, if a rate of travel is calculated as 1.65 miles per hour, that profile may be assigned as being a human. If a rate of travel for a profile traveling between highway areas is calculated as 55 miles per hour, that profile may be assigned as being a vehicle.

Then, at 210, the population density approximation program 110A, 110B calculates population density. This calculation may be performed by taking a count of profiles, converting it to an estimated count of entities, and dividing it by one or more density factors. In at least one embodiment, the estimated count of entities may be equal to the number of profiles. In at least one other embodiment, the estimated count of entities may be reduced by a weighted reduction as discussed in step 206. In yet another embodiment, the estimated count of entities may be specific to a type of entity. For example, if an area is an intersection, the estimated count of entities may be an estimated count of the number of profiles that correspond to vehicles.

The calculation may provide population density in a variety of forms, which may include raw population counts, population per unit area, population per unit time, or population per unit area per unit time. In at least one embodiment, the units of area may be distinct areas, such as intersections. In at least one embodiment, the units of area may be standard units of area, such as square feet or square meters. Units of time may be minutes, hours, days, or weeks. For example, if an intersection currently contains 30 entities, the raw population count is 30, the population density per area is 30 entities. If the intersection is 100 square feet in size, the population density per square foot is 0.3 entities per square foot. If the estimated count of entities is an estimated count of vehicles, and there are 30 profiles that correspond to vehicles in the intersection over the course of an hour, the population density may be 30 vehicles per intersection per hour.

In at least one embodiment, the population density approximation program 110A, 110B may establish a measure of congestion. In at least one embodiment, population density approximation program 110A, 110B may define congestion as unusually high population density, as compared to historical data at that time. Alternatively, the population density approximation program 110A, 110B may define "congestion" as population density above a certain preconfigured threshold. For example, if a train car is intended to accommodate 300 people comfortably, congestion may be defined as a population density exceeding the threshold of 300 entities per train car. In at least one embodiment, the population density approximation program 110A, 110B may measure congestion by the degree by which population density exceeds the average or exceeds a threshold. The population density approximation program 110A, 110B may measure this excess by many methods, including multiplicatively or additively. For example, if the threshold for a train car is 300 entities, a train car seating 600 entities may be congested by a multiplicative factor of two, or may be congested by an additive factor of 300.

Finally, at 212, the population density approximation program 110A, 110B performs a management action based on this correlated data or the calculated population density. Possible management actions may include rerouting vehicular or pedestrian traffic, modifying traffic and crosswalk signal timing, rerouting ride share vehicles, and modifying flow of public transit resources. For example, if a given intersection is seeing an unusually large amount of pedestrian traffic, the population density approximation program 110A, 110B may slow vehicular traffic at nearby intersections, enhancing the safety of pedestrians in that intersection. Alternatively, population density approximation program 110A, 110B may recommend to vehicles, client devices (e.g., client computing device 102), or software programs (e.g., software program 108) that an alternative path may be used to avoid heavy pedestrian traffic, thereby enhancing the safety of pedestrians and assisting drivers in reaching their destination more quickly. Furthermore, the population density approximation program 110A, 110B may receive the collected supplemental data that may influence the management action performed. For example, if supplemental data indicates a traffic accident near a concert venue toward the end of a concert, the management action may be to direct traffic toward different routes. Alternatively, if supplemental data indicates that a local sporting event will be ending late, the management action may be to direct taxis or ride share services to increase supply to the area around the venue around the expected end of the sporting event. Additionally, population density approximation program 110A, 110B may note congestion on one train line, or receive supplemental information indicating that train line is facing serious delays, and direct people to a different train line.

In an alternate embodiment, the management action may be providing correlated data or population density data to a user. The user may be a city planner or other municipal employee, a shopping center manager, an airport manager, or a traffic expert. The user may then act based on that data. For example, if correlated data shows that an individual area in a shopping center was frequently congested, but that nearby areas were not, the user may decide to space a new store in a nearby area so as to avoid that congestion, or in the same area to capitalize on that traffic. Alternatively, if correlated data indicates that vehicular congestion in a first area led to increased foot traffic in second area, the user may plan an outdoor event such as a farmer's market in the second area on a day when congestion in the first area is likely. Alternatively, if correlated data indicates that entities exiting a given bus at a given bus stop usually walk at least one block further west, the user may move the bus stop one block further west, reducing pedestrian traffic overall, and particularly between those blocks.

It may be appreciated that FIG. 2 provides only an illustration of one implementation and does not imply any limitations with regard to how different embodiments may be implemented. Many modifications to the depicted environments may be made based on design and implementation requirements.

Figure 3:
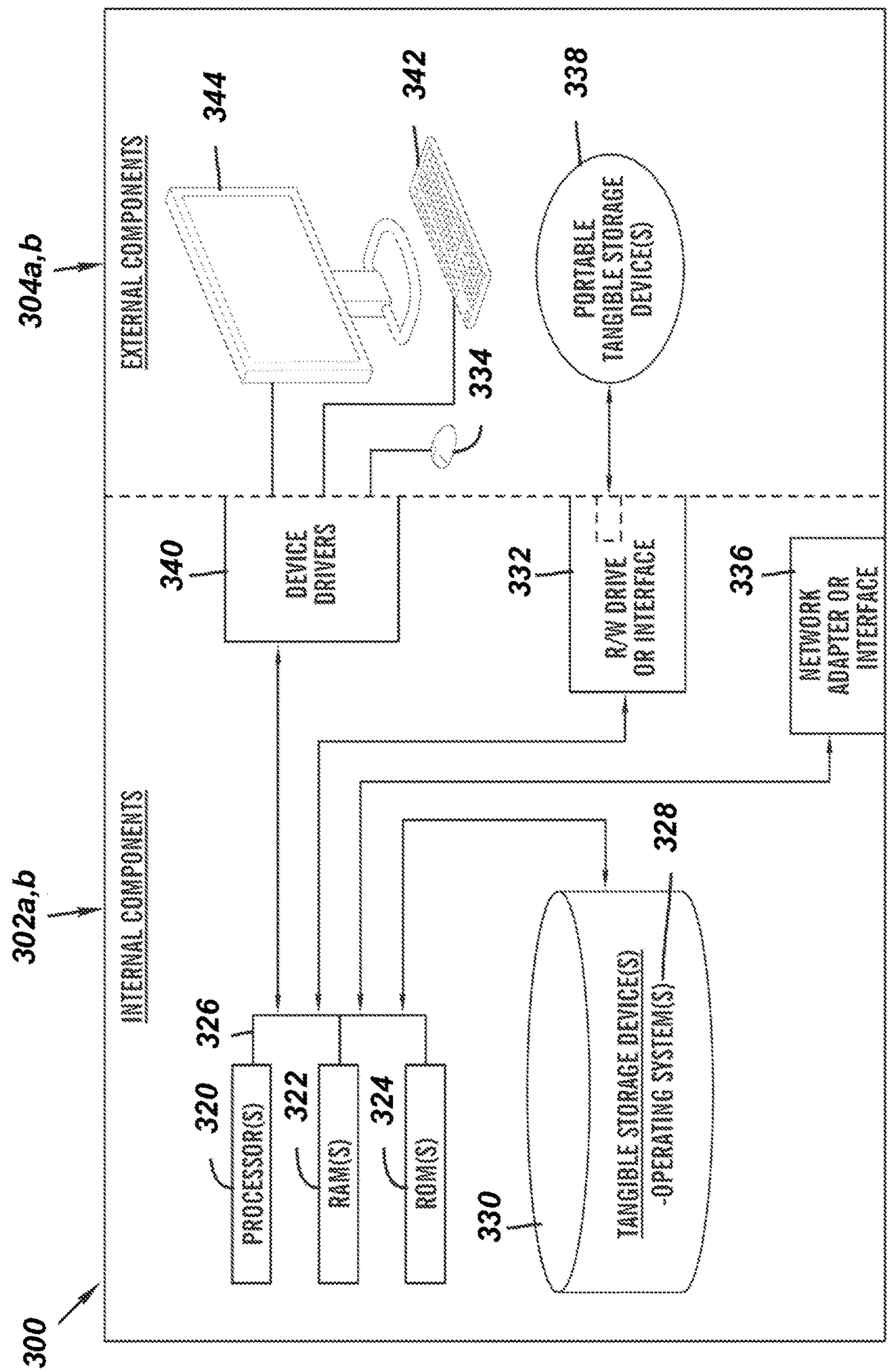
FIG. 3 is a block diagram of internal and external components of computers and servers depicted in FIG. 1 according to at least one embodiment.

FIG. 3 is a block diagram 300 of internal and external components of the client computing device 102. the server 112, and the networking device 120 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the server 112, and the networking device 120 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the population density approximation program 110A in the client computing device 102 and the population density approximation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 *a,b* also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the population density approximation program 110A, 110B, can be stored on one or more of the respective portable computer-readable tangible storage devices 338, read via the respective R/W drive or interface 332, and loaded into the respective hard drive 330.

Each set of internal components 302 *a,b* also includes network adapters or interfaces 336 such as a TCP/IP adapter cards, wireless Wi-Fi interface cards, or 3G or 4G wireless interface cards or other wired or wireless communication links. The software program 108 and the population density approximation program 110A in the client computing device 102 and the population density approximation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the population density approximation program 110A in the client computing device 102 and the population density approximation program 110B in the server 112 are loaded into the respective hard drive 330. The network may comprise copper wires, optical fibers, wireless transmission, routers, firewalls, switches, gateway computers and/or edge servers.

Each of the sets of external components 304 *a,b* can include a computer display monitor 344, a keyboard 342, and a computer mouse 334. External components 304 *a,b* can also include touch screens, virtual keyboards, touch pads, pointing devices, and other human interface devices. Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
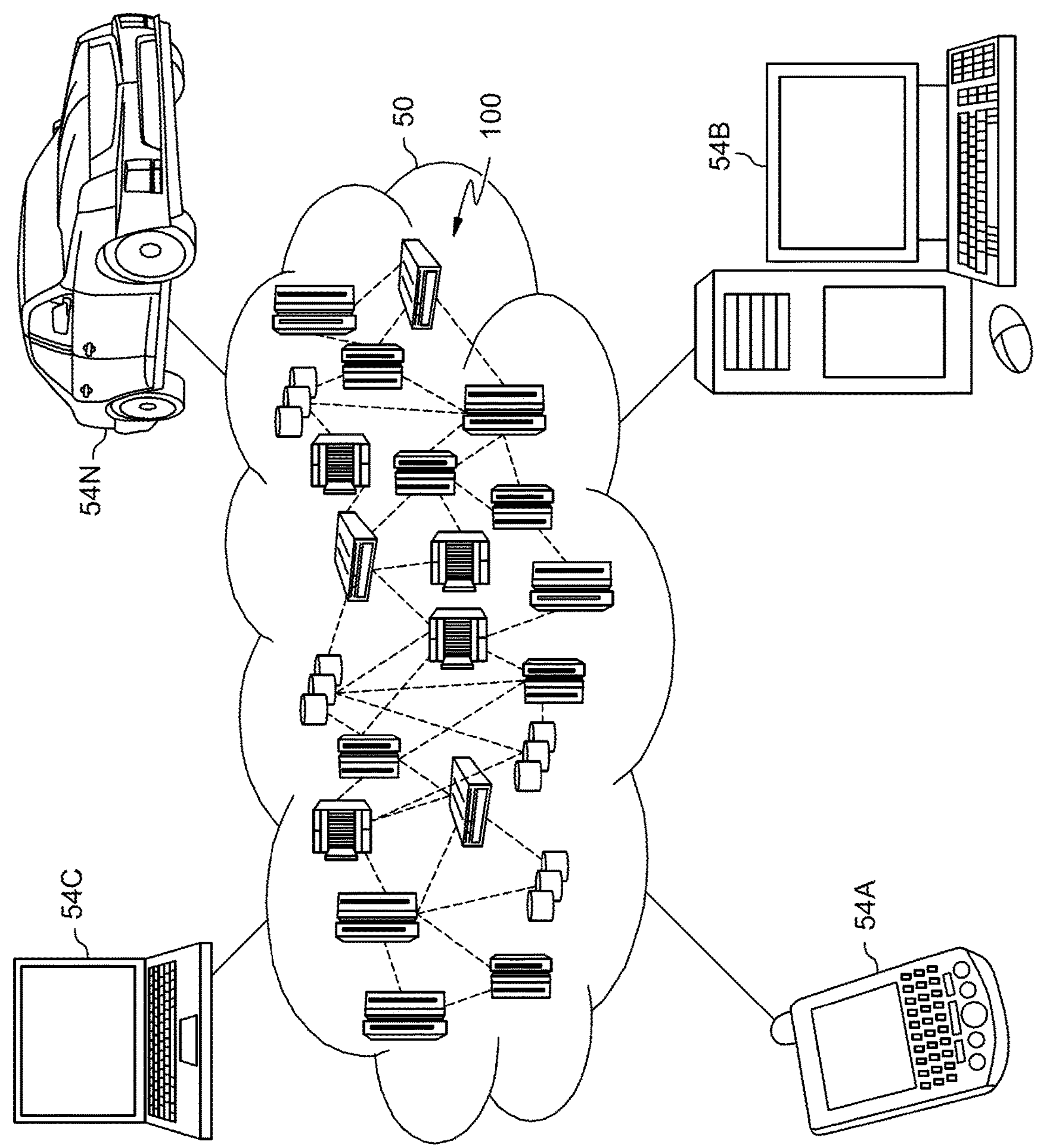
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
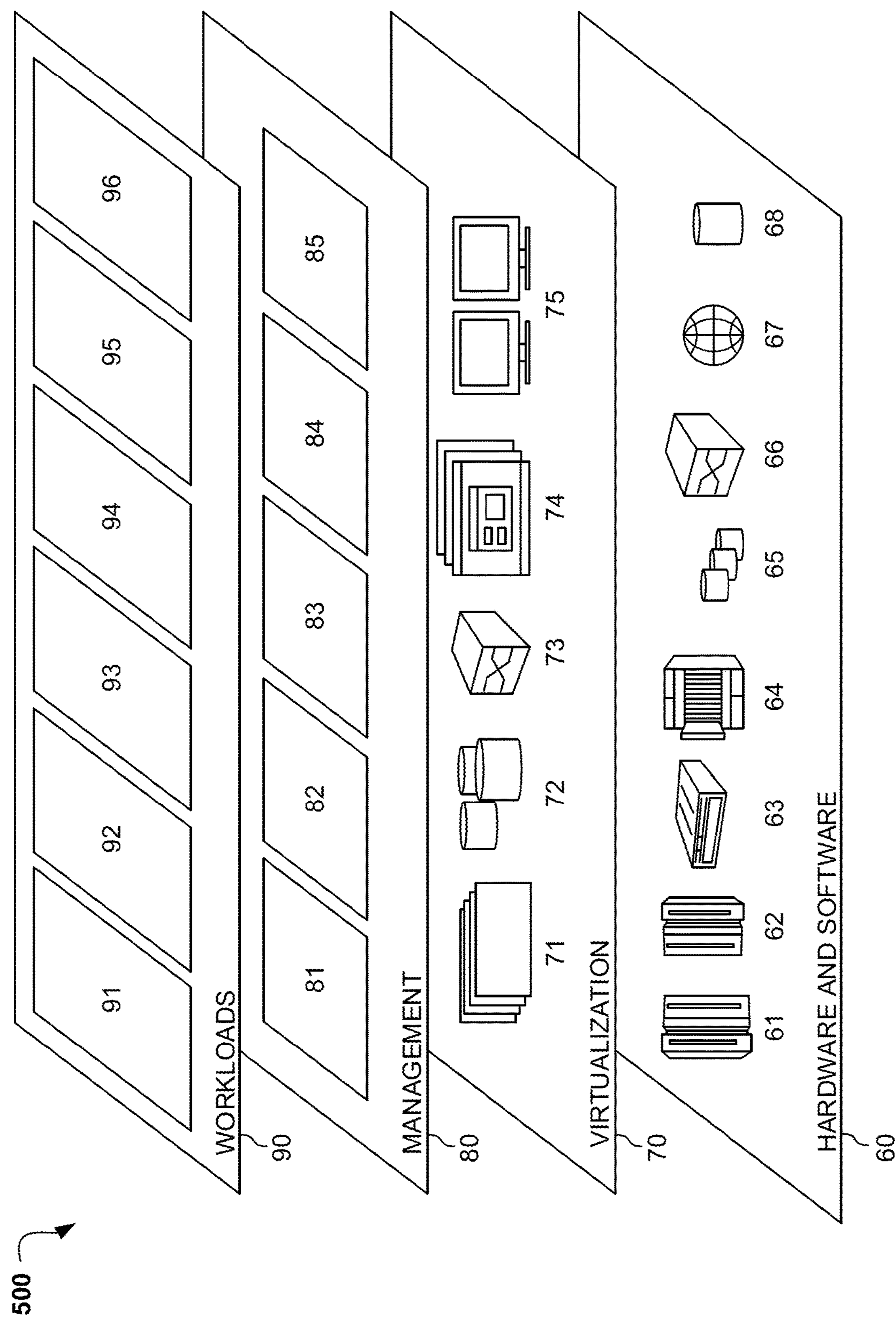
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and population density approximation 96. Population density approximation 96 may relate to approximating population density and post-incident scenario analysis by correlating data about device movements across different areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:

identifying a plurality of devices as entering a preconfigured distance of a preconfigured area, wherein the preconfigured area is one of a plurality of preconfigured areas;

gathering device-identifying information corresponding to the devices for mapping to an entity;

creating a device profile corresponding to the entity using the device-identifying data;

correlating device movements across the plurality of preconfigured areas using the device profile associated with each device of the plurality of devices;

wherein correlating comprises merging each device profile for the entity based on the movements; and calculating a population density based on the correlated device movements.

2. The method of claim 1, further comprising:

performing a management action based on the correlated device movements or the calculated population density.

3. The method of claim 2, wherein the management action is selected from a group consisting of providing instructions for a software program to reroute vehicular or pedestrian traffic, modifying traffic and crosswalk signal timing, providing instructions for a software program to reroute ride share vehicles, and modifying a flow of public transit resources.

4. The method of claim 1, further comprising:

deduplicating multiple profiles corresponding to one entity, wherein the deduplication is performed by merging profiles based on a proximity between a plurality of devices and common movements between the plurality of devices.

5. The method of claim 1, wherein the plurality of preconfigured areas comprises at least one stationary area and at least one mobile area.

6. The method of claim 1, further comprising:

gathering supplemental data regarding the device or the preconfigured area, wherein the supplemental data is selected from a group consisting of data from weather services, public transit data, location data, infrastructure data, additional data broadcast by the device, and data sufficient to identify a device type of the device.

7. The method of claim 2, wherein the management action comprises providing the correlated device movements or population density to a user.

8. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying a plurality of devices as entering a preconfigured distance of a preconfigured area, wherein the preconfigured area is one of a plurality of preconfigured areas;

gathering device-identifying information corresponding to the devices for mapping to an entity;

creating a device profile corresponding to the entity using the device-identifying data;

correlating device movements across the plurality of preconfigured areas using the device profile associated with each device of the plurality of devices;

wherein correlating comprises merging each device profile for the entity based on the movements; and calculating a population density based on the correlated device movements.

9. The computer system of claim 8, further comprising:

performing a management action based on the correlated device movements or the calculated population density.

10. The computer system of claim 9, wherein the management action is selected from a group consisting of providing instructions for a software program to reroute vehicular or pedestrian traffic, modifying traffic and crosswalk signal timing, providing instructions for a software program to reroute ride share vehicles, and modifying a flow of public transit resources.

11. The computer system of claim 8, further comprising:

deduplicating multiple profiles corresponding to one entity, wherein the deduplication is performed by merging profiles based on a proximity between a plurality of devices and common movements between the plurality of devices.

12. The computer system of claim 8, wherein the plurality of preconfigured areas comprises at least one stationary area and at least one mobile area.

13. The computer system of claim 8, further comprising:

gathering supplemental data regarding the device or the preconfigured area, wherein the supplemental data is selected from a group consisting of data from weather services, public transit data, location data, infrastructure data, additional data broadcast by the device, and data sufficient to identify a device type of the device.

14. The computer system of claim 9, wherein the management action comprises providing the correlated device movements or population density to a user.

15. A computer program product, the computer program product comprising:

one or more non-transitory computer-readable tangible storage medium and program instructions stored on at least one of the one or more tangible storage medium, the program instructions executable by a processor capable of performing a method, the method comprising:

identifying a plurality of devices as entering a preconfigured distance of a preconfigured area, wherein the preconfigured area is one of a plurality of preconfigured areas;

gathering device-identifying information corresponding to the devices for mapping to an entity;

creating a device profile corresponding to the entity using the device-identifying data;

correlating device movements across the plurality of preconfigured areas using the device profile associated with each device of the plurality of devices;

wherein correlating comprises merging each device profile for the entity based on the movements; and calculating a population density based on the correlated device movements.

16. The computer program product of claim 15, further comprising:

performing a management action based on the correlated device movements or the calculated population density.

17. The computer program product of claim 16, wherein the management action is selected from a group consisting of providing instructions for a software program to reroute vehicular or pedestrian traffic, modifying traffic and crosswalk signal timing, providing instructions for a software program to reroute ride share vehicles, and modifying a flow of public transit resources.

18. The computer program product of claim 15, further comprising:

deduplicating multiple profiles corresponding to one entity, wherein the deduplication is performed by merging profiles based on a proximity between a plurality of devices and common movements between the plurality of devices.

19. The computer program product of claim 15, wherein the plurality of preconfigured areas comprises at least one stationary area and at least one mobile area.

20. The computer program product of claim 15, further comprising:

gathering supplemental data regarding the device or the preconfigured area, wherein the supplemental data is selected from a group consisting of data from weather services, public transit data, location data, infrastructure data, additional data broadcast by the device, and data sufficient to identify a device type of the device.

* * * * *